United States Patent
Jiang et al.

(10) Patent No.: US 7,003,637 B2
(45) Date of Patent: Feb. 21, 2006

(54) DISK ARRAY DEVICE WITH UTILIZATION OF A DUAL-BUS ARCHITECTURE DEPENDENT ON DATA LENGTH OF CACHE ACCESS REQUESTS

(75) Inventors: Xiaoming Jiang, Odawara (JP); Satoshi Yagi, Ooi (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 10/767,444

(22) Filed: Jan. 30, 2004

(65) Prior Publication Data

US 2005/0097272 A1 May 5, 2005

(30) Foreign Application Priority Data

Nov. 5, 2003 (JP) .............................. 2003-375166

(51) Int. Cl.
G06F 12/00 (2006.01)
G06F 13/18 (2006.01)
(52) U.S. Cl. ................. 711/151; 711/130; 710/33; 710/40; 710/107; 710/307
(58) Field of Classification Search ............ 711/3, 711/118, 119, 126, 130, 147, 148, 150, 151, 711/111–114; 710/2, 36–38, 40, 33, 107, 710/112, 300, 307
See application file for complete search history.

(56) References Cited

U.S. PATENT DOCUMENTS

| | | | |
|---|---|---|---|
| 5,014,194 A | 5/1991 | Itoh | |
| 5,237,391 A | 8/1993 | Huggins | |
| 5,461,723 A | 10/1995 | Shah et al. | |
| 5,640,600 A | 6/1997 | Satoh et al. | |
| 5,872,944 A * | 2/1999 | Goldrian et al. | 710/305 |
| 6,182,112 B1 | 1/2001 | Malek et al. | |
| 6,202,116 B1 * | 3/2001 | Hewitt | 710/305 |
| 6,493,774 B1 | 12/2002 | Suzuki et al. | |
| 6,587,905 B1 | 7/2003 | Correale et al. | |
| 2002/0099901 A1 * | 7/2002 | Tanaka et al. | 711/6 |
| 2002/0169901 A1 * | 11/2002 | Fujibayashi et al. | 710/38 |
| 2004/0010659 A1 | 1/2004 | Inoue | |
| 2004/0250003 A1 | 12/2004 | Chang | |

FOREIGN PATENT DOCUMENTS

| | | |
|---|---|---|
| JP | 08-137630 | 11/1994 |
| JP | 2000-250712 | 3/1999 |

* cited by examiner

Primary Examiner—Hong Chong Kim
Assistant Examiner—Shane Thomas
(74) Attorney, Agent, or Firm—Reed Smith LLP; Stanley P. Fisher, Esq.; Juan Carlos A. Marquez, Esq.

(57) ABSTRACT

In a disk control device arranged to include a CPU, a plurality of channel control units, a plurality of disk control units, a cache memory, and a data transfer integrated circuit communicably connected to the cache memory via a plurality of data buses, when receiving a request for access to the cache memory from any one of the CPU, the channel control units and the disk control units, the data transfer integrated circuit provides access to the cache memory by use of a certain number of one or ones of the data buses, which number is determinable in accordance with a transfer data length that is set in the access request.

6 Claims, 10 Drawing Sheets

DISK ARRAY DEVICE WITH UTILIZATION OF A DUAL-BUS ARCHITECTURE DEPENDENT ON DATA LENGTH OF CACHE ACCESS REQUESTS

BACKGROUND OF THE INVENTION

The present invention relates to a disk array device and a control method of the disk array device.

An information processing apparatus performs every type of processing by inputting and outputting data to and from magnetic disks. However, the performance of accessibility to magnetic disks stays much lower than the access performance relative to semiconductor memory devices. In view of this, a cache memory with a semiconductor memory as its storage element is provided within a disk control device, for temporarily storing data of a magnetic disk(s) in the cache memory to thereby enhance the performance of access from the information processing apparatus.

As the performance of accessing to this cache memory significantly affects the processing performance in the information processing apparatus, several schemes have been employed for expanding the bus width of the cache memory within the disk control device and/or for accelerating bus clocks to thereby further enhance the access performance to the cache memory. Additionally in JP-A-2000-250712, there is disclosed a method for providing a data transfer integrated circuit (selector) and for selecting, when contention or conflict occurs between access requests to a cache memory, a certain number of ones from among the access requests, which number corresponds to the number of data buses coupled to the cache memory.

Unfortunately, since there is a limitation of the space in the substrate which can be utilized for the disk array device, it is difficult to expand the bus width of cache memory.

SUMMARY OF THE INVENTION

In the method as disclosed in JP-A-2000-250712, a time required for data transfer becomes shorter due to expanding of data bus width, so that an overhead for data bus allocation control causes deterioration of utilization efficiency of the data bus.

Accordingly, a need is felt to reduce the time necessary for control processes in the data transfer integrated circuit among the time of an entire data transfer operation without having to expand the bus width of the cache memory, to thereby improve an effective speed relative to accessing to the cache memory.

The present invention has been made in view of the above-noted problem, and an object of the invention is to provide a data transfer integrated circuit, a data transfer control method, and a disk control device.

A disk array device in accordance with one aspect of the present invention which attains the foregoing object includes a plurality of channel control units for performing data transfer and reception between these units and an information processing apparatus that is communicably connected thereto, a plurality of disk control units for performing data transfer and reception between these units and a plurality of hard disk drives as communicably connected thereto, a CPU for performing control of the plurality of channel control units and the plurality of disk control units, a cache memory for storage of data being transferred and received between the channel control units and the disk control units, and a data transfer integrated circuit which is communicably connected via one or more buses to the channel control units, the disk control units and the CPU and also connected via a plurality of data buses to the cache memory, wherein when receiving a request for access to the cache memory from any one of the channel control units, the disk control units and the CPU, the data transfer integrated circuit accesses to the cache memory by using the data buses, a number of which is determined in accordance with a transfer data length that is set in the access request.

Note that the access request as used herein may include a request for readout from a hard disk drive(s), a request for write into a hard disk drive(s) and the like.

Whereby, when receiving a cache memory access request from a channel control unit or else and then executing the access required, the data transfer integrated circuit is capable of modifying or updating the number of data buses being used for access to the cache memory in accordance with the transfer data length being set in the access request.

For example, it is possible to perform control in a way which follows: when the access request is the one that is for sequential data with a long transfer data length, allocate thereto a plurality of data buses; when the request is for random data with a short transfer data length, allocate a single data bus.

In the case of sequential data, the ratio of a time required for the data transfer per se is high in an event of from data bus allocation up to data transfer completion. In view of this, using a plurality of data buses for access of the sequential data makes it possible to shorten the data transfer time.

Alternatively in the case of random data, the ratio of a time taken for data bus allocation is high in the event of from data bus allocation up to data transfer completion. Accordingly, using a single data bus for access of such random data makes it possible to use the remaining data buses for access of other random data. More specifically, in a circumstance that several requests for access to a plurality of random data items occur consecutively, it is possible to perform access of another random data item by use of an out-of-use or "idle" data bus without waiting for completion of a previous random data access session. This makes it possible to shorten a data-bus allocation wait time, which in turn enables improvement in usage rate of the data buses.

Thus it is possible to improve the effective speed with respect to accessing to a storage device from external equipment, without performing data bus width expansion and clock improvements.

These and other objects, features and advantages of the invention as disclosed herein will be apparent from the following more particular description of presently preferred embodiments of the invention, as illustrated in the accompanying drawings.

DESCRIPTION OF THE EMBODIMENTS

Overview

Figure 1:
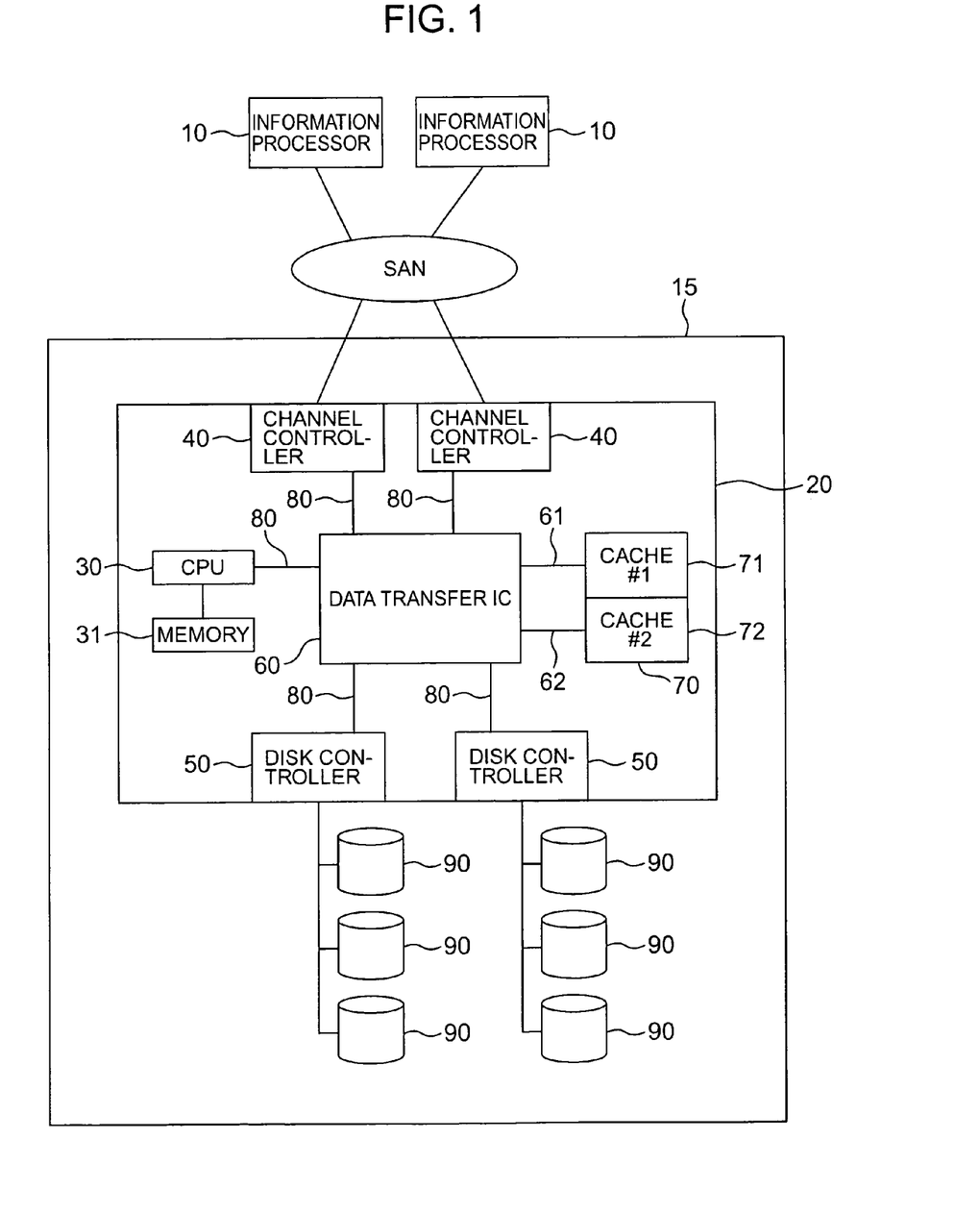
FIG. 1 is a block diagram showing an entirety of an information processing system in accordance with one embodiment of the invention.

FIG. 1 is a block diagram showing a configuration of an information processing system, which includes a disk array device equipped with a data transfer integrated circuit in accordance with this embodiment.

An information processing apparatus 10 is a computer with a central processing unit (CPU) and a memory. This computer may be a personal computer, workstation, mainframe, or any equivalents thereto. In some cases the information processing apparatus 10 is made up of a plurality of computers linked together. In the information processing apparatus 10 an application software is made active.

For example, the application software provides functions of an automated teller system in banks or an airplane seat reservation system. Information processing apparatuses 10 and a disk array device 15 are connected together via communication means (communication lines, network), respectively. Examples of the communication means are a local area network (LAN), storage area network (SAN), Internet small computer system interface (iSCSI), Fibre Channel, Enterprise Systems Connection or "ESCON" (registered trademark), Fibre connection or FICON™, and others.

The disk array device 15 is arranged to comprise a controller 20 and hard disk drives 90. The controller 20 includes, but not limited to, a CPU 30, channel control units 40, disk control units 50, and a data transfer integrated circuit 60, which are interconnected together via buses 80. The buses 80 are peripheral component interconnect (PCI) buses, for example. In addition, the CPU 30, channel control units 40 and disk control units 50 are connected to a cache memory 70 through the data transfer integrated circuit 60.

Each channel control unit 40 is an interface for performing communications between itself and any one of the information processing apparatuses 10. The channel control unit 40 has a function of receiving and accepting a block access request(s) in accordance with fiber channel protocols.

Each disk control unit 50 is an interface for permitting data transfer and receipt or "delivery" between it and any one of the hard disk drives 90. The disk control unit 50 functions to transfer a data input/output request(s) relative to a hard disk drive(s) 90 in conformity with protocols which define commands for control of the hard disk drive(s) 90 and others.

The CPU 30 is the one that provides controls over an entirety of the disk array device 15. To do this, CPU 30 executes a micro-program stored in a memory 31 to thereby perform control of the channel control units 40, disk control units 50, data transfer integrated circuit 60, etc.

The cache memory 70 is made up of a cache memory 1 (71) and a cache memory 2 (72). Each cache memory 71, 72 has a single data input/output port, which is connected to the data transfer integrated circuit 60 via a data bus 61, 62. Additionally in this embodiment, assume that a conventional data bus width is 16 B, whereas the bus width of data bus 61, 62 is set at 8 B, which is a two-division of 16 B. The cache memory 70 is mainly used to temporarily store therein data to be sent and received between the channel control units 40 and disk control units 50. For instance, in case a data input/output command received by a channel control unit 40 from an information processing apparatus 10 is a write command, the channel control unit 40 writes into the cache memory 70 the write data as received from the information processing apparatus 10. In addition, a disk control unit 50 reads the write data out of the cache memory 70 and then writes it into more than one of the hard disk drives 90.

In some cases the controller 20 may have a function of controlling the hard disk drives 90 based on what is called the redundant array of inexpensive disks (RAID) scheme at an appropriate RAID level (for example, 0, 1, 5) as defined therein.

The data transfer integrated circuit 60 is used to control access to the cache memory 70 from any one of the CPU 30, channel control units 40, and disk control units 50.

Data Transfer Integrated Circuit

Figure 2:
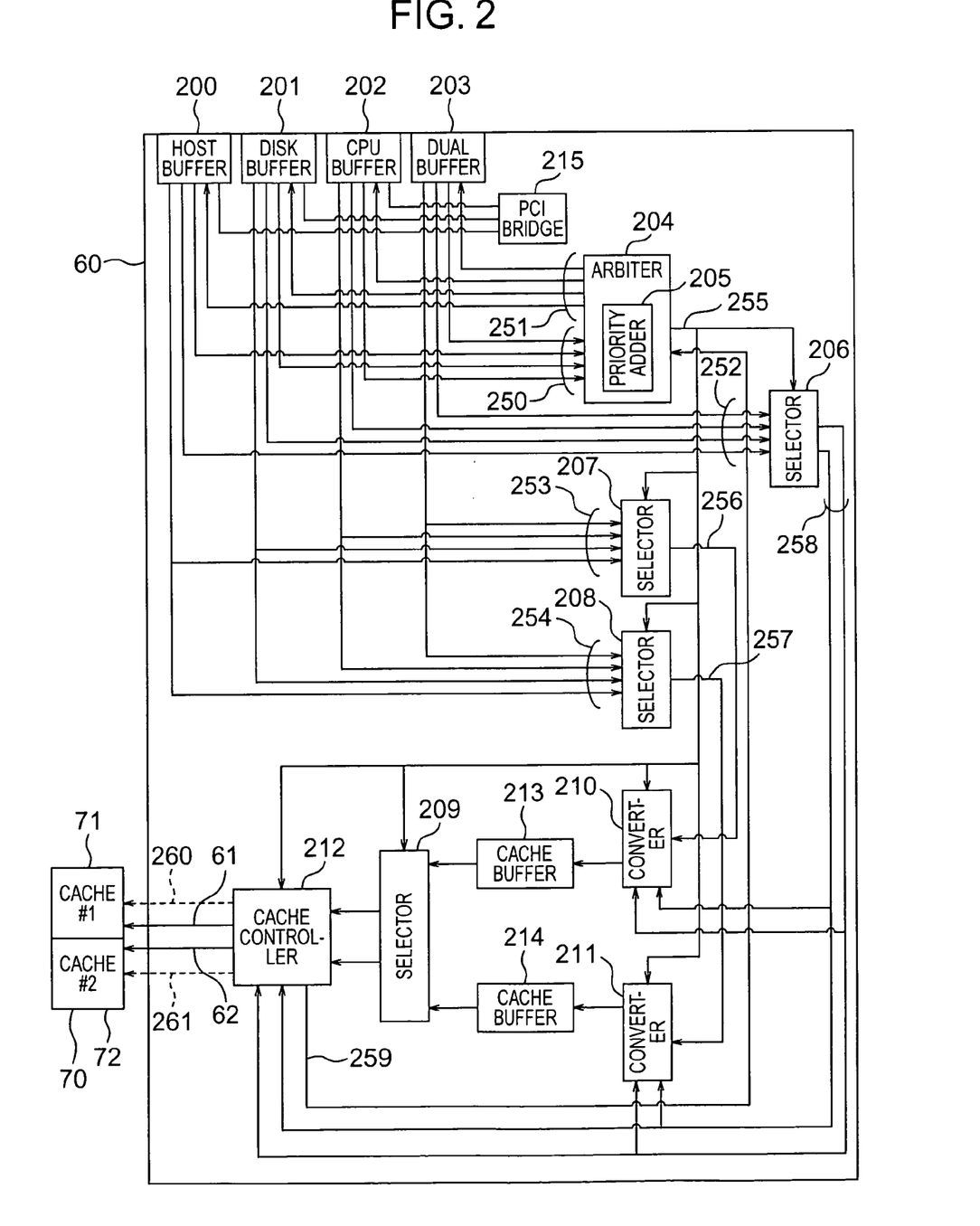
FIG. 2 is a block diagram showing a configuration of a data transfer integrated circuit in this embodiment.

FIG. 2 is a block diagram showing a configuration of the data transfer integrated circuit 60. The data transfer integrated circuit 60 is arranged to have a host buffer 200, disk buffer 201, CPU buffer 202, dual buffer 203, arbitration circuit 204, and cache control circuit 214 and others.

The host buffer 200 is connected via a bus 80 to a channel control unit 40; the disk buffer 201 is to a disk control unit 50; the CPU buffer 202 is to CPU 30. Although only one host buffer 200 and one disk buffer 201 are depicted in FIG. 2, it is understood that these buffers are the same in number as the corresponding channel control units 40 and disk control units 50. Additionally, respective buffers 200 to 202 are connected by a PCI bridge 215. Note here that the dual buffer 203 is a buffer for performing communications between controllers 20 in a dual controller configuration as will be described later.

In the host buffer 200, there are temporarily stored a request for access to the cache memory 70 from a channel control unit 40 and data to be sent and received between the channel control unit 40 and cache memory 70. The disk buffer 201 provides temporary storage of an access request of from a disk control unit 50 to the cache memory 70 along with data being sent and received between the disk control unit 50 and cache memory 70. Similarly, the CPU buffer 202 temporarily stores therein an access request of from CPU 30 to cache memory 70 along with data being delivered between it and CPU 30. The access requests as used herein include, but not limited to, a request for reading data out of the cache memory 70 and a data write request to cache memory 70.

An explanation will be given of a data flow in an exemplary case where the access requests being stored in the buffers 200–202 are write requests to the cache memory 70.

The arbitration (arbiter) circuit 204 reads via a signal line 250 the access request that is stored in each of the buffers 200–202 for requesting access to the cache memory 70. The arbiter circuit 204 judges, with respect to these access requests, permission or authorization of the access to cache memory 70 using either one or both of the data buses 61 and 62 in accordance with a procedure to be later described, and then issues a notice to any access grant one or ones of the buffers 200–202 through a signal line or lines 251. Additionally the arbiter circuit 204 passes both a SEL signal indicative of more than one of the buffers 200–202 which is allowed to provide access to the cache memory 70 and a bus select signal indicating data bus 61, 62 to be used for such access toward selectors 206–209, a converter circuit 210, 211 and a cache control circuit 212 through signal lines 255.

Upon receipt of the SEL signal from the arbiter circuit 204, the selector 206 reads through command buses 252 an input/output command being stored in certain one of the buffers 200–202 which is designated by the SEL signal. Next, the selector 206 transfers the input/output command thus read out toward the converter circuit 210, 211 and cache control circuit 212 via command buses 258.

When receiving the SEL signal from the arbiter circuit 204, the selector 207, 208 reads data via a data bus 253, 254 from the SEL signal-designated one of the buffers 200–202. Next, selector 207, 208 sends the read data to the converter circuit 210, 211 via data bus 256, 257. Assume here that the bus width of data buses 253–257 is 64 B.

Figure 3:
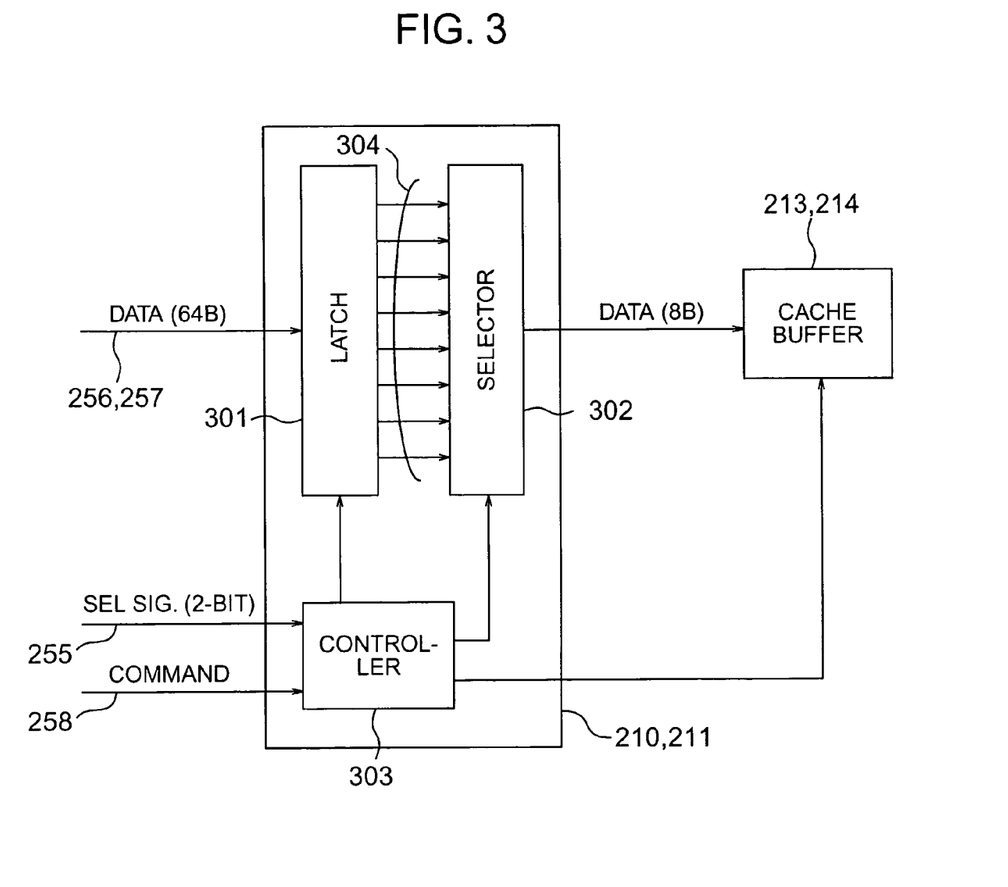
FIG. 3 is a block diagram showing an arrangement of a converter circuit included in the data transfer integrated circuit in this embodiment.

FIG. 3 is a block diagram showing the converter circuit 210, 211. The converter circuit 210, 211 is arranged to have a latch circuit 301, selector 302, control circuit 303 and others. The latch circuit 301 is operatively responsive to receipt of a latch enable signal, for reading data of 64 B from the selector 207, 208 and then sending forth the data to the selector through a data bus 304, which is made up of eight 8 B bus lines. Selector 302 sequentially selects one from among the 8 B buses based on a control signal to be sent from the control circuit 303 and then transfers data to cache buffer 213, 214.

Upon receipt of the SEL signal from the arbiter circuit 204, the selector 209 sends to the cache control circuit 212 the data being stored in the cache buffer 213, 214.

The cache control circuit 212 is connected by a data bus 61 and control signal 260 to the cache memory 1 (71) and is coupled by data bus 62 and control signal 261 to the cache memory 2 (72). When receiving the SEL signal and bus select signal from the arbiter circuit 204, the cache control circuit 212 reads data out of the selector 209. The cache control circuit 212 uses the data bus 61, 62 designated by the bus select signal to write the data into the cache memory 70, based on a write command to be received via command bus 258 from selector 206. In addition, the cache control circuit 212 performs error correction code (ECC) generation and checking in the event of data transfer and receipt between it and cache memory 70. Additionally the cache control circuit 212 notifies arbiter circuit 204 of the use condition of data bus 61, 62 via signal line 259.

In this way, the data transfer integrated circuit 60 uses either one or both of the data buses 61 and 62 to perform access to the cache memory 70 upon receipt of a request for access to the cache memory from any one of the CPU 30, channel control units 40 and disk control units 50. Note that in case the access request is a read request, the data flow on data buses and conversion processing at the converter circuit 210, 211 become merely reversed: regarding the method of selecting data bus 61, 62 which is a feature of the present invention, this is the same as the case of the write request.

Data Bus Select Processing

Figure 4:
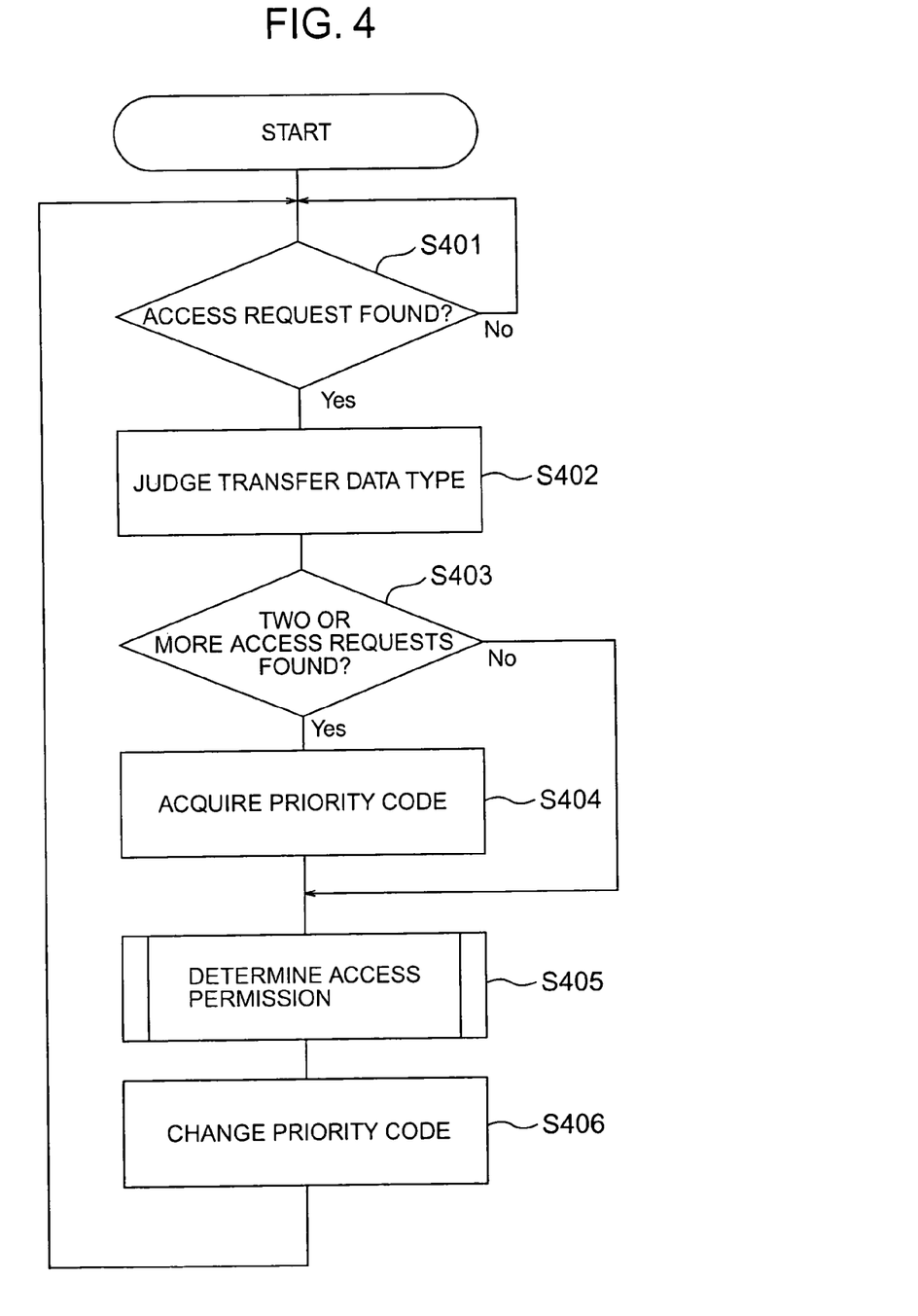
FIG. 4 is a flow chart showing a procedure of data bus selection processing in an arbitration circuit used in the data transfer integrated circuit in this embodiment.

Next, an explanation will be given of the select processing of data bus 61, 62 to be used in an event of data transfer from a respective one of the buffers 200–202 to the cache memory 70, with reference to a flow chart of FIG. 4.

When the arbiter circuit 204 receives an access request from any one of the buffers 200–202 (at step S401), this circuit determines or "judges" the data type of a data block to be transferred based on this access request (at S402). Here, the data type is the one that represents whether a transfer data length being set in the access request is longer than a predefined reference data length (1 KB, for example). In this embodiment, data with the transfer data length longer than the reference data length is called the "sequential data," whereas the one with the transfer data length shorter than the reference data length is called "random data." When sending a cache memory access request to the data transfer integrated circuit 60, if the bus 80 is a 64-bit PCI bus then an external apparatus adds the transfer data length of such data to upper 32 bits in an address phase of PCI and then transmits it. The data transfer integrated circuit 60 performs judgment of data type by comparing this transfer data length with the reference data length.

Next, the arbiter circuit 204 judges whether access requests are from a plurality of buffers 200–202 (at step S403). In case the access requests are from the plurality of buffers 200–202, the arbiter circuit 204 performs acquisition of a priority code with respect to the access requests (at S404), and then performs allocation of data bus 61, 62 through access permission determination processing (S405). Alternatively, in case an access request is from a single one of the buffers 200–202, the arbiter circuit 204 no longer performs the priority code acquisition in this case, this circuit performs allocation of data bus 61, 62 by access permission determination processing (S405).

Note here that the priority code indicates an order of priority in units of buffers 200–202 being connected to the arbiter circuit 204, and is stored in the arbiter circuit 204. For example, the priority code is a 2-bit value: in an initial state, "00" is allocated to the host buffer; "01" is to the disk buffer; and, "10" is to the CPU buffer by way of example. Additionally suppose that the priority code "00" is the highest in order of priority.

Lastly the arbiter circuit 204 performs modification or update of the priority codes (S406). This is in order to allocate the data bus 61, 62 equally to respective buffers 200–202 by letting the priority order of the data bus 61, 62 allocated one of the buffers 200–202 be the lowest one. An explanation will be given using an example with the above-noted priority code being of 2 bits.

In case the priority codes are in the initial state, when the data bus 61, 62 is allocated to the disk buffer 201, the arbiter circuit 204 modifies the priority code of disk buffer 201 to "10," which is the lowest in order of priority. Then, the arbiter circuit 204 subtracts 1 from the priority code of one of the buffers 200–202 which has its priority order lower than the value "01" that is the original priority code of disk buffer 201 in such a manner that the resultant priority order becomes higher by one. Whereby, the priority code of CPU buffer 202 is set at "01" so that the priority orders of respective buffers 200–202 are updated.

Figure 5:
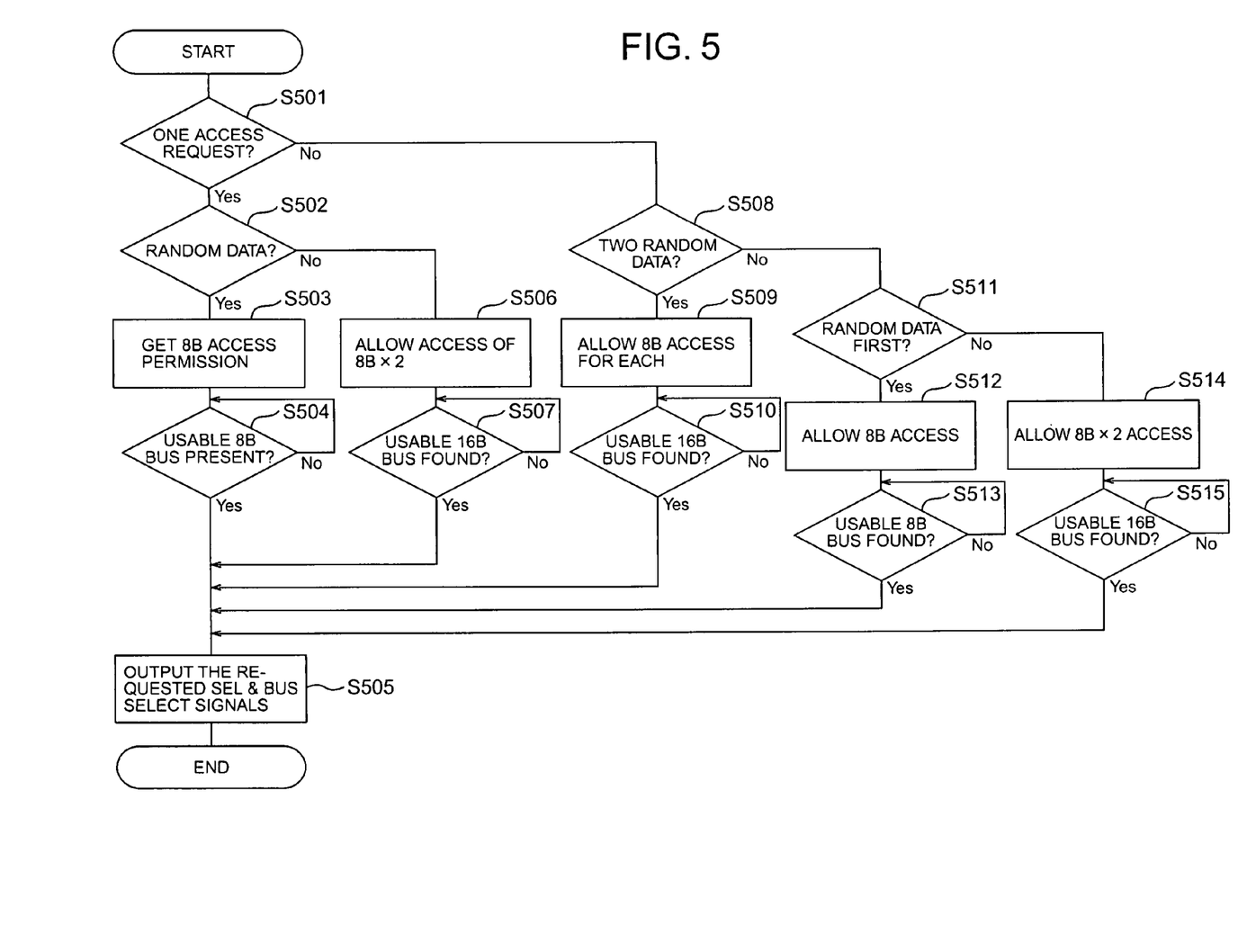
FIG. 5 is a flowchart showing a routine of access permission determination processing in the arbiter circuit of the data transfer integrated circuit in this embodiment.

The above-stated access permission determination processing at the arbiter circuit 204 will be explained using a flow chart of FIG. 5.

Firstly, the arbiter circuit 204 judges whether the request for access to the cache memory 70 is a single one (at step S501). In case the access request to cache memory 70 is a single one, the arbiter circuit 204 judges whether the data type of a data block being transferred based on this access request is random data or not (S502). If the data type is the random data, then the arbiter circuit 204 determines access permission with a 8 B bus width (S503). The arbiter circuit 204 waits until either one of the data buses 61 and 62 becomes usable (S504); when it becomes usable, this circuit 204 outputs a SEL signal for selection of one from among the buffers 200–202 which stores therein the access request and also a bus select signal for selection of a single data bus 61, 62 that became usable (S505).

Next, an explanation will be given of another case where the request for access to the cache memory 70 is a single one and the data type of the data being sent based on this access request is sequential data. In this case, the arbiter circuit 204 determines, with respect to the access request, access permission with a data width of 8 B×2, that is, 16 B (at step S506). The arbiter circuit 204 waits until both of the data buses 61 and 62 become usable (S507); when the both become usable, this circuit outputs a SEL signal for selection of one of the buffers 200–202 storing the access request along with a bus select signal for selection of two data buses 61–62 (S505). Note that although in the case of such sequential data the arbiter circuit 204 is arranged to wait until both of the data buses 61–62 become usable at step S507, this arrangement may be modified to select only a usable data bus 61, 62 in case where either one of the data buses 61–62 is usable.

An explanation will be given about an event that a plurality of requests are available for access to the cache memory 70. If this is the case, the arbiter circuit 204 affirms whether data types of data being sent based on two ones of the plurality of access requests which are high in order of priority are both random data (at step S508). In case the data types of the data being sent based on these two access requests are both the random data, the arbiter circuit 204 determines access permission with a 8 B bus width for each access request (S509). The arbiter circuit 204 waits until both of the data buses 61–62 become usable (S510); when these become usable, the circuit 204 outputs a SEL signal for selecting two ones of the buffers 200–202 storing the access requests along with a bus select signal for selection of two data buses 61–62 (S505). Note that although in the case of the presence of two random data blocks the arbiter circuit 204 is arranged to wait until both of the data buses 61–62 become usable at step S510, the arrangement is alterable to select only a usable data bus 61, 62 in accordance with the priority order of the two access requests in case either one of the data buses 61–62 is usable.

Next, an explanation will be given of a case where there are more than two requests for access to the cache memory 70 and the data types of the data being sent based on two access requests high in order of priority are random data and sequential data. The arbiter circuit 204 checks whether the data type of a data block being sent based on the access request high in priority order is random data (at step S511). In case the data being sent based on the access request with such high priority order is random data, the arbiter circuit 204 determines access permission with a 8 B bus width for the access request (S512). The arbiter circuit 204 waits until either one of the data buses 61–62 becomes usable (S513); when it becomes usable, this circuit 204 outputs a SEL signal for selection of one of buffers 200–202 storing the access request and also a bus select signal for selection of any one of data buses 61–62 which has became usable (S505).

An explanation will next be given of a case where the data types of the data being transferred based on two access requests are random data and sequential data, wherein the data type of the data being sent based on an access request high in order of priority is the sequential data. The arbiter circuit 204 determines access permission with a bus width of 8 B×2 i.e., 16 B with respect to this access request (at step S514). The arbiter circuit 204 waits until both of the data buses 61 and 62 become usable (S515); when these become usable, the circuit 204 outputs a SEL signal for selection of ones of the buffers 200–202 storing the access requests along with a bus select signal for selection of two data buses 61–62 (S505).

Here, a time required for access to the cache memory 70 from an external apparatus will be explained by use of a practical example. Note that in this example, an overhead of PCI bus is 30 CLK (clocks), whereas an overhead of bus selection of the data transfer integrated circuit 60 is 20 CLK. Additionally, data transfer between the data transfer integrated circuit 60 and cache memory 70 consumes 22 CLK with a bus width of 16 B.

An explanation will be given of an exemplary case where requests for access of 512 B data are issued simultaneously to the cache memory 70 from two external apparatuses.

Figure 6:
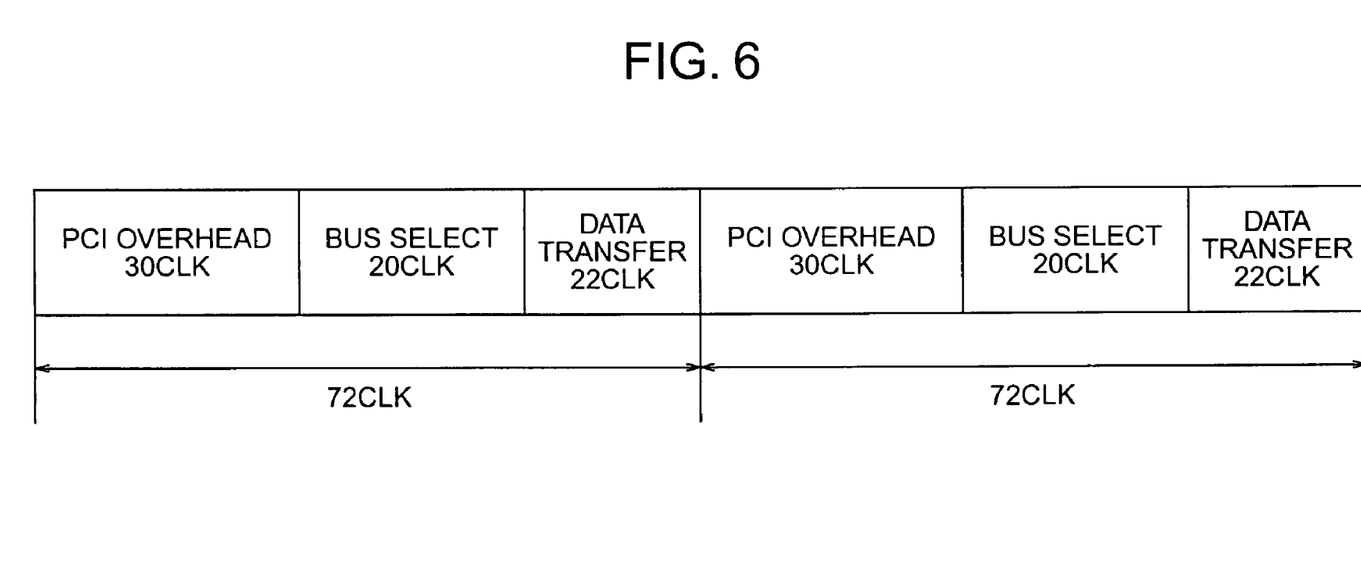
FIG. 6 is a diagram showing an example of an access time in one prior art in the case of performing accessing of two random data blocks between an external apparatus and a cache memory.

FIG. 6 shows an example of the case where a single data bus with a bus width of 16 B is used for connection between the data transfer integrated circuit 60 and cache memory 70. The data transfer integrated circuit 60 performs sequential allocation of 16 B data bus with respect to two access requests. For data transfer of each access request, a total of 72 CLK must be taken, which is equal to PCI overhead (30 CLK)+bus selection (20 CLK)+data transfer (22 CLK). Note however that regarding the second access request, it is forced to wait until completion of data transfer of the first access request; thus, an actual result is that a total of 144 CLK is to be required, which is equal to the first access request's data transfer time (72 CLK)+ the second access request's data transfer (72 CLK). In short, the average access time becomes 108 CLK, which is equal to 72 CLK+144 CLK/2.

Figure 7:
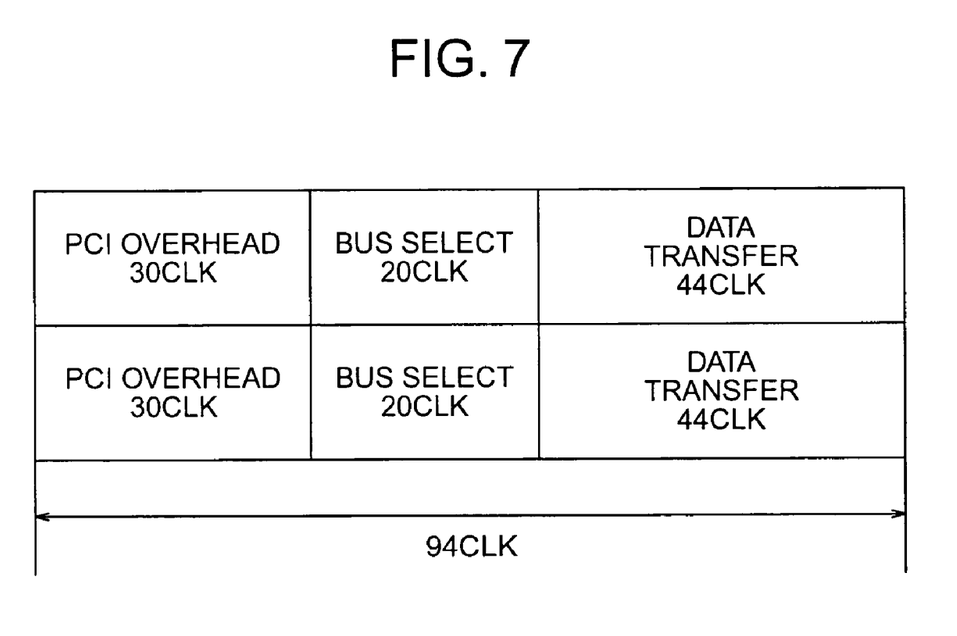
FIG. 7 is a diagram showing an example of the access time in this embodiment in the case of performing accessing of two random data blocks between the external apparatus and cache memory.

On the other hand, FIG. 7 shows an exemplary case where two data buses 61 and 62 each having a bus width of 8 B are used to connect between the data transfer integrated circuit 60 and cache memory 70. Here, let the data of more than 1 KB be the sequential data. The data transfer integrated circuit 60 handles 512 B data as random data, and allocates a single data bus 61, 62 with respect to each access request, and then performs two data transfer operations simultaneously. Due to this, a time required for PCI overhead and bus selection relative to two data blocks is the same as that for a single data block, which becomes 50 CLK that is represented by PCI overhead (30 CLK)+bus selection (20 CLK). Since data transfer between it and the cache memory 70 is performed using the data bus 61, 62 with a bus width of 8 B, a time taken in this case is two times greater than the time required in the case of 16 B that is, 44 CLK. In short, transfer of two data blocks is to be completed with consumption of a time of 94 CLK, which is given as PCI overhead and bus selection (50 CLK)+data transfer (44 CLK). In this case the average access time is 94 CLK. In other words, this is shorter than 108 CLK in the case of connection between the data transfer integrated circuit 60 and cache memory 70 by a single data bus with 16 B bus width, resulting in an improvement in effective speed or rate in access to the cache memory 70.

Figure 8:
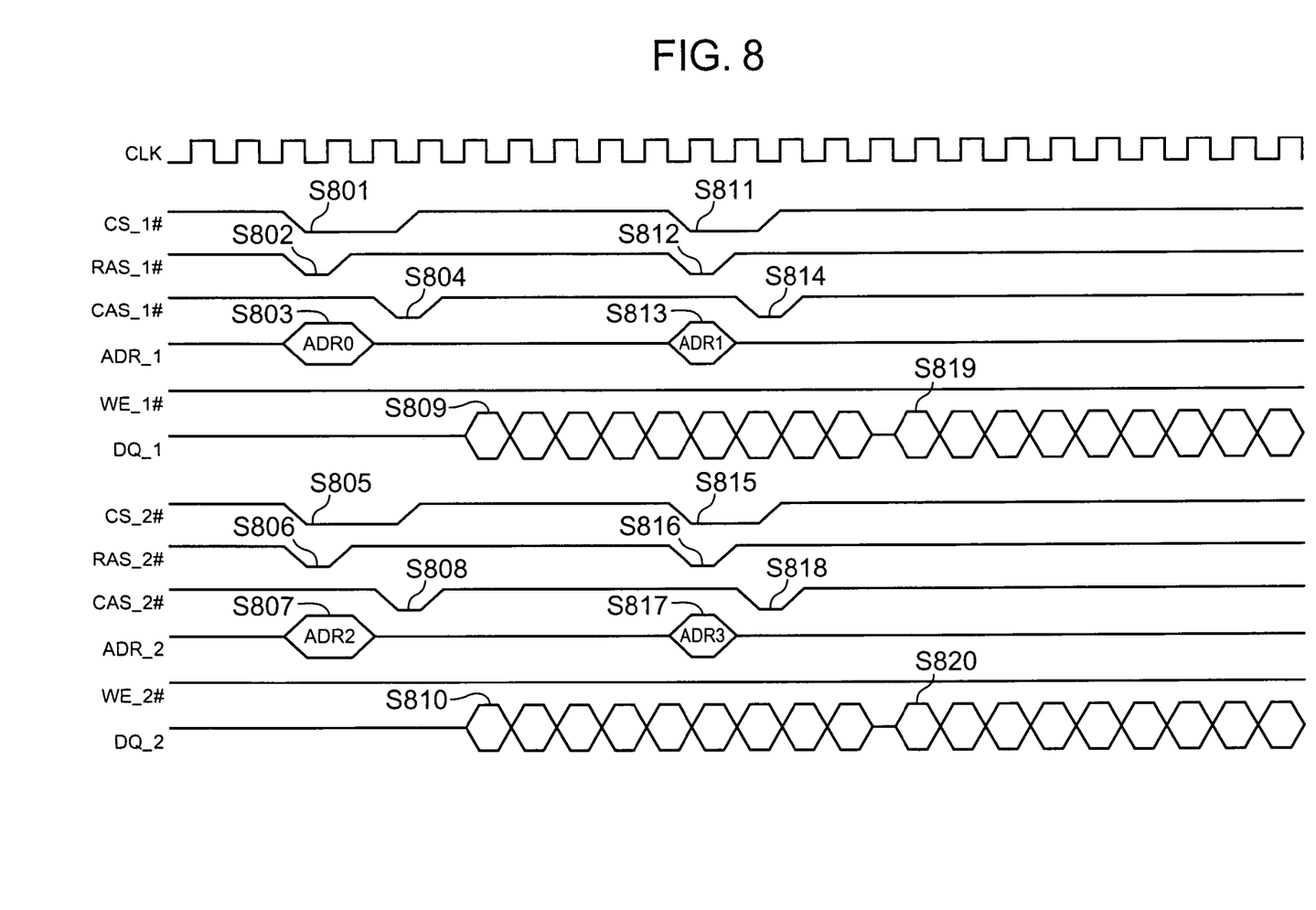
FIG. 8 is a diagram showing a timing chart of the cache memory in this embodiment when using two data buses to read a single sequential data block out of the cache memory.
Figure 9:
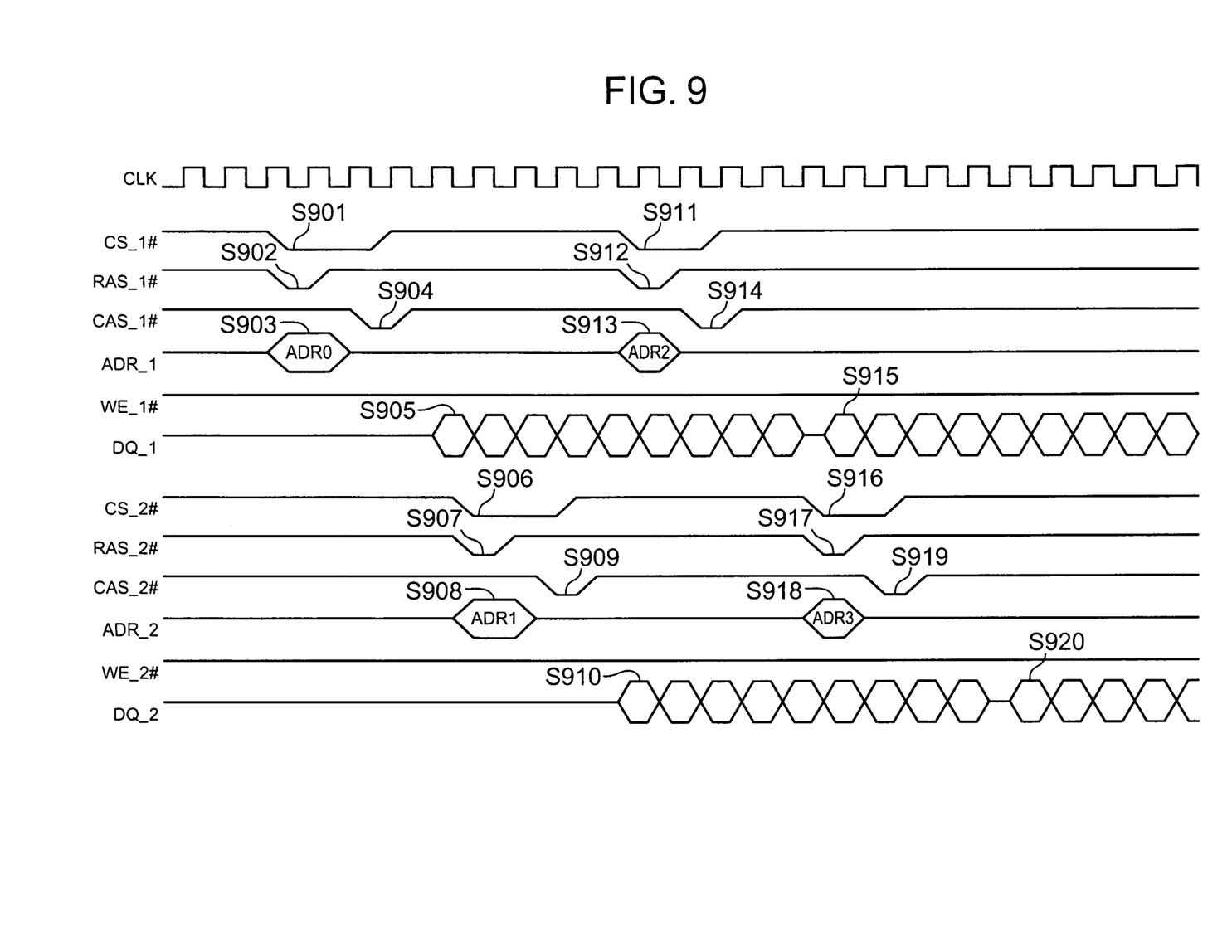
FIG. 9 is a diagram showing a timing chart of the cache memory in this embodiment when reading two random data blocks out of the cache memory by using a single data bus for each data block.

FIGS. 8 and 9 show examples of a timing chart of the cache memory 70 in this embodiment. First, respective signals will be set forth. CLK is a clock signal for control of the cache memory. A signal with "_1" added thereto is a signal of the cache memory 1 (71), while a signal added with "_2" is a signal of the cache memory 2 (72). Additionally, "#" is a signal that becomes effective or enabled when setting at an L level. A chip select (CS) signal is a signal for setting either the cache memory 1 (71) or cache memory 2 (72) in a selected state. A row address strobe (RAS) signal and a column address strobe (CAS) signal are the ones each of which passes a timing for giving an address of input/output data to the cache memory 70. ADR is an address bus that indicates the address of input/output data. A write enable (WE) signal is the one that enables writing into cache memory 70. DQ_1 represents the data bus 61, whereas DQ_2 denotes data bus 62.

FIG. 8 is a timing chart in an event that two data buses 61 and 62 are used to read sequential data out of the cache memory 1 (71) and cache memory 2 (72). Suppose here that addresses of the sequential data range from ADR0 to ADR3. The cache control circuit 212 asserts CS_1# (S801), asserts RAS_1# (S802), gives ADR0 to ADR_1 (S803), and asserts CAS_1# (S804). Whereby, data of ADR0 is output from the data bus 61 (S809). In a way parallel to this operation (S801 to S809), the cache control circuit 212 performs control of the cache memory 2 (72). The cache control circuit 212 asserts CAS_2# (S805), asserts RAS_2# (S806), gives to ADR_2 the ADR2 that is the beginning address of a last half part of the sequential data (S807), and asserts CAS_2# (S808). Whereby the data of ADR2 is output from the data bus 62 (S810). In a similar way, read the data of ADR1 out of data bus 61 (S811–S819); then, readout of the data of ADR3 is performed by data bus 62.

FIG. 9 is a timing chart in a case where two random data blocks are read in such a way that a random data block is from either the cache memory 1 (71) or cache memory 2 (72) while using a single data bus 61, 62 for each. Assume here that addresses of the first random data block are ADR0 and ADR2, while addresses of the second random data block are ADR1 and ADR3. The cache control circuit 212 uses data bus 61 to read the data of ADR0 of the first random data block (S901 to S905). When the cache control circuit 212 receives a SEL signal indicative of access permission with respect to the second random data block and also a bus select signal from the arbiter circuit 204, this circuit 212 uses data bus 62 to read the data of ADR1 of the second random data block (S906–S910). In a similar way, operations are performed for reading the data of ADR2 using data bus 61 (S911–S915) and for reading the data of ADR3 by data bus 62 (S916–S920). Note that when the access requests for two random data blocks are made simultaneously, both the readout of the ADR0 data and the read of ADR1 data get started at a time.

In the embodiment stated above, when receiving an access request to the cache memory 70 from external apparatus and then executing this access, it is possible to appropriately modify or update the exact number of data buses to be used during access to the cache memory 70 in a way conformity with the transfer data length being set in this access request.

It is possible to provide controls in a way which follows: in case the access request is for sequential data with a long transfer data length, allocate two data buses thereto; when the request is for random data with a short transfer data length, allocate a single data bus, by way of example.

In the case of sequential data, the ratio of a time required for data transfer per se is high in a session of from the data bus allocation up to the data transfer completion. For this reason, using two data buses for access of the sequential data makes it possible to shorten the data transfer time period.

Alternatively in the case of random data, the ratio of a time taken for data bus allocation is high in the session of from the data bus allocation to the data transfer completion. For the very reason, using a single data bus for access of the random data makes it possible to use the remaining data bus for access to another random data. To make a long story short, in a circumstance that access requests to a plurality of random data blocks occur continuously, it is possible, without having to wait for the completion of access of the previous random data, to use an out-of-use or "idle" data bus to perform access of another random data block; thus, it is possible to shorten a data bus allocation waiting time, thereby enabling improvement in usage rate of the data buses involved.

Thus it is possible to improve the effective speed of accessing to the cache memory 70 from any external apparatus without requiring expansion of data bus width and improvements in clocks.

In addition, when receiving an access request to two random data blocks, it is possible to allocate a single data bus with respect to each data block through one-time data bus allocation processing and then perform access to the data. Thus it is possible to further shorten the data bus allocation wait time period, thereby enabling further improvement in usage rate of the data buses.

Whereby, it is possible to further improve the effective speed with respect to the access to the cache memory 70 without performing data bus width expansion and clock improvements.

Data Transfer Between Controllers

An explanation will next be given of the control at the data transfer integrated circuit 60 in the case of a "dual controller configuration" in which the disk array device 15 has two controllers 20.

Figure 10:
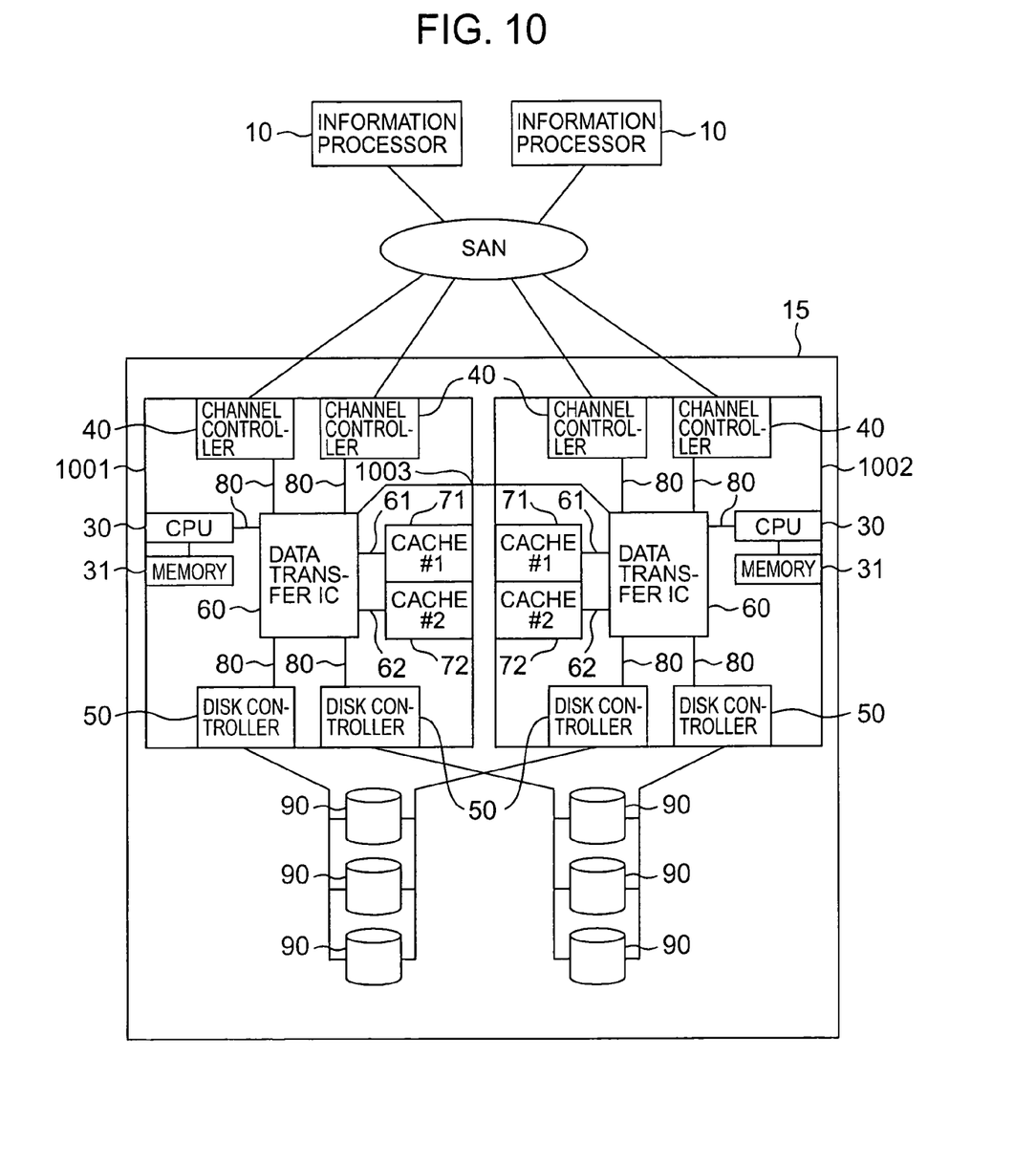
FIG. 10 is a block diagram showing a disk array device having two controllers each similar in structure to that in this embodiment.

FIG. 10 is a block diagram showing a configuration of an information processing system in case the disk array device 15 has a first controller 1001 and a second controller 1002. The first controller 1001 and second controller 1002 are each similar in hardware arrangement to the controller 20 shown in FIG. 1.

Each hard disk drive 90 is communicably connected to the both controllers 1001 and 1002. With such an arrangement, when obstruction occurs in either one of the controllers 1001–1002, it is possible by using the other to perform access to the hard drives 90.

Data transfer integrated circuits 60 of the two controllers 1001 and 1002 are arrange so that each dual buffer 203 is connected by its own or "dedicated" bus 1003 to thereby make it possible to perform transfer and receipt of data between the controllers 1001–1002. This in turn provides backup of the data between controllers 1001–1002, thus enhancing the reliability of the disk array device 15.

An operation will be explained in an event that the first controller 1001 receives a write request from an information processing apparatus 10. First, the data transfer integrated circuit 60 of first controller 1001 writes the data received from a channel control unit 40 into a cache memory 70 of first controller 1001. Then, transfer the data to the data transfer integrated circuit 60 of the second controller 1002. The data transfer integrated circuit 60 of second controller 1002 writes the data into a cache memory 70 of second controller 1002 and then notifies the data transfer integrated circuit 60 of first controller 1001 of write completion. Upon receipt of such notice, the data transfer integrated circuit 60 of first controller 1001 notifies a channel control unit 40 of the write completion. And, this channel control unit 40 notifies the information processing apparatus 10 of the write completion. Thereafter, a disk control unit 50 of first controller 1001 reads the data out of the cache memory 70 via the data transfer integrated circuit 60 and then writes it into more than one of the hard disk drives 90.

Alternatively, in an event that the first controller 1001 receives a data read request from an information processing apparatus 10, data transfer is performed between the controllers 1001 and 1002 even when the cache memory 70 of the first controller 1001 is inaccessible due to occurrence of obstruction or else. In this case, the data transfer integrated circuit 60 of first controller 1001 sends a request for transfer of the data toward the data transfer integrated circuit 60 of second controller 1002. Upon receipt of this request, the data transfer integrated circuit 60 of second controller 1002 reads the data out of the cache memory 70 of second controller 1002 and then sends it to the cache memory 70 of first controller 1001. Then, the data transfer integrated circuit 60 of first controller 1001 transfers the data to the channel control unit 40.

Additionally, there is also a case where the CPU 30 of each controller 1001, 1002 provides access to the cache memory 70 of the other controller 1001, 1002 via the data transfer integrated circuit 60.

As apparent from the foregoing discussion, data transfer operations between the controllers 1001 and 1002 involve two events: the so-called "direct memory access (DMA) transfer" that comes up with a data input/output request from information processing apparatus 10, and "CPU access" accompanying a request from CPU 30. Of these two events, the DMA transfer is such that a time taken for data transmission between the controllers 1001–1002 directly affects a response time relative to the data input/output request from the information processing apparatus 10. For this reason, when the data transfer integrated circuit 60 of one controller 1001, 1002 sends forth a data transfer request to the data transfer integrated circuit 60 of the other controller 1001, 1002, the former sends it to the latter while adding thereto an access type indicator indicative of whether this request is the DMA transfer or the CPU access. At the data transfer integrated circuit 60 that has received this transfer request, this circuit provides access to the cache memory 70 by use of two data buses if the access type is the DMA transfer and gets access to cache memory 70 using a single data bus if the access type is the CPU access.

In short, in cases where the access type is the DMA transfer, using two data buses makes it possible to shorten the data transfer time between the controllers 1001 and 1002, thereby enabling acceleration of a response to the information processing apparatus 10. Alternatively in case the data type is CPU access, using only one data bus makes it possible to allocate the remaining data bus to handling of an access request of the random data stated supra and/or an access request from the other CPU 30. Thus it is possible to shorten the allocation wait time of data buses, thereby enabling the data buses to improve in usage rate. This in turn makes it possible to improve the effective speed of accessing to the cache memory 70 from an external apparatus, without performing data bus width expansion and clock improvements.

While the present invention has been described with reference to specific embodiments, the embodiments are for facilitation of the understanding of this invention and are not to be construed as limiting the invention. The invention may be modified and improved without departing from the spirit and scope thereof while allowing several equivalents thereof also to be included therein.

For example, in the embodiments stated supra, the cache memory 70 is arranged to include two memories—i.e., cache memory 1 (71) and cache memory 2 (72); however, the same may alternatively be structured from more than three memories.

It is possible to provide a new and improved disk array device and a disk array device control method.

It should be further understood by those skilled in the art that although the foregoing description has been made on embodiments of the invention, the invention is not limited thereto and various changes and modifications may be made without departing from the spirit of the invention and the scope of the appended claims.

The present application claims priority upon Japanese Patent Application No. 2003-375166 filed on Nov. 5, 2003, which is incorporated herein by reference.

What is claimed is:

1. A disk array device comprising:
   a plurality of hard disk drives;
   a plurality of channel control units for performing data transfer and reception between the channel control units and a plurality of information processing apparatuses being communicably connected thereto through a storage area network;
   a plurality of disk control units for performing data transfer and reception between the disk control units and said plurality of hard disk drives as communicably connected thereto;
   a CPU for performing control of said plurality of channel control units and said plurality of disk control units;
   a cache memory for storage of data being transferred and received between said channel control units and said disk control units; and
   a data transfer integrated circuit communicably connected via more than one bus to said channel control units, said disk control units and said CPU and also connected via a plurality of data buses to said cache memory, wherein
   said data transfer integrated circuit is responsive to an access request to said cache memory from one of said channel control units, said disk control units and said CPU, for providing access to said cache memory using one or more of said plurality of data buses, a number of which is determined in accordance with a transfer data length being set in the access request,
   said data buses are two data buses,
   said data transfer integrated circuit uses said two data buses to provide access to said cache memory when the transfer data length being set in the access request is longer than a predefined reference data length and, when the transfer data length set in the access request is shorter than or equal to said predefined reference data length, uses one of said data buses to get access to said cache memory,
   said data transfer integrated circuit includes a priority adding unit for adding, when receiving access requests to said cache memory from a plurality of ones of said channel control units or said disk control units or said CPU, an order of priority to the plurality of access requests, and
   said data transfer integrated circuit uses said two data buses to provide access to said cache memory when a transfer data length being set in one of said access requests with the highest order of priority is longer than said predefined reference data length and, when transfer data lengths being set in said access request with the highest order of priority and an access request with the second highest order of priority are shorter than said predefined reference data length, said data transfer integrated circuit uses one of said data buses for each of the access requests to thereby get access to said cache memory.

2. The disk array device according to claim 1, wherein in case the transfer data lengths being set in said access request with the highest order of priority and said access request with the second highest order of priority are shorter than said predefined reference data length, and when both of said two data buses are idle, said data transfer integrated circuit allocates one of said data buses to each of the two access requests and then performs access to said cache memory in a parallel way.

3. The disk array device according to claim 5, wherein in case the transfer data length being set in said access request with the highest order of priority is longer than said predefined reference data length, and when any one of said two data buses is busy, said data transfer integrated circuit allocates a remaining one of said data buses which is idle with respect to the access request and then performs access to said cache memory.

4. A control method of a disk array device arranged to include:
a plurality of channel control units for performing data transfer and reception between the channel control units and a plurality of information processing apparatuses being communicably connected thereto through a storage area network;
a plurality of disk control units for performing data transfer and reception between the disk control units and a plurality of hard disk drives as communicably connected thereto;
a CPU for performing control of said plurality of channel control units and said plurality of disk control units;
a cache memory for storage of data being transferred and received between said channel control units and said disk control units; and
a data transfer integrated circuit communicably connected via more than one bus to said channel control units, said disk control units and said CPU and also connected via a plurality of data buses to said cache memory,
wherein an operation in said data transfer integrated circuit includes the steps of:
receiving an access request to said cache memory from any one of said channel control units, said disk control units and said CPU;
selecting certain one or ones of said data buses, a number of which is determined in accordance with a transfer data length being set in the access request;
using the selected data bus to thereby provide access to said cache memory,
wherein said data buses are two data buses, and
said step of selecting the data buses includes one of the steps of:
selecting said two data buses when the transfer data length being set in the access request is longer than a predefined reference data length; and
selecting one of said data buses when the transfer data length as set in the access request is shorter than or equal to said predefined reference data length,
wherein said data transfer integrated circuit has a step of adding, when receiving access requests to said cache memory from a plurality of ones of said channel control units or said disk control units or said CPU, an order of priority to the plurality of access requests, and
said step of selecting the data buses includes one of the steps of:
selecting said two data buses when a transfer data length being set in one of said access requests with the highest order of priority is longer than said predefined reference data length, and
when transfer data lengths being set in said access request with the highest order of priority and an access request with the second highest order of priority are shorter than said predefined reference data length, selecting one of said data buses for each of the access requests.

5. The disk array device control method according to claim 4, wherein in an event that the transfer data lengths being set in said access request with the highest order of priority and said access request with the second highest order of priority are shorter than said predefined reference data length, and when both of said two data buses are idle, said step of selecting the data buses selects one of said data buses to each of the two access requests.

6. The disk array device control method according to claim 4, wherein in case the transfer data length being set in said access request with the highest order of priority is longer than said predefined reference data length, and when any one of said two data buses is busy, said step of selecting the data buses selects a remaining one of said data buses which is idle with respect to the access request.

* * * * *